July 22, 1969   J. CSAKI   3,456,698
MOTOR-DRIVEN MANUALLY OPERABLE COMPASS SAW
Filed March 17, 1967   2 Sheets-Sheet 1
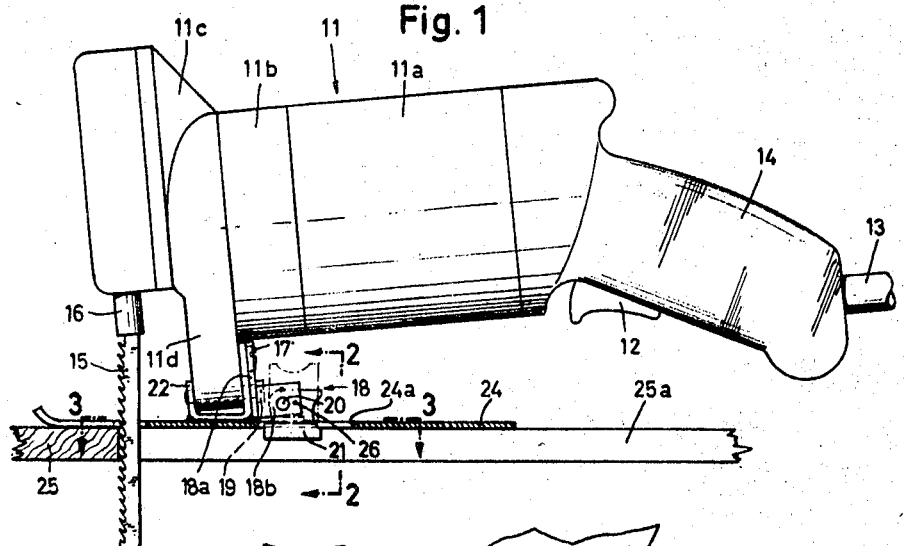
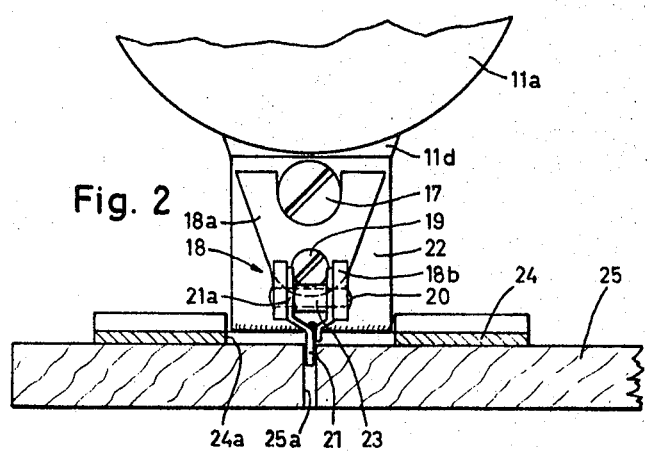
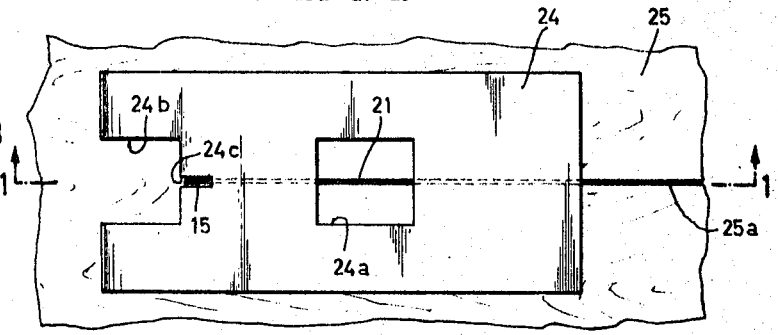
Inventor:
Joachim Csaki July 22, 1969 J. CSAKI 3,456,698

MOTOR-DRIVEN MANUALLY OPERABLE COMPASS SAW

Filed March 17, 1967 2 Sheets-Sheet 2

Inventor:
Joachim Csaki

United States Patent Office 3,456,698
Patented July 22, 1969

1

3,456,698
MOTOR-DRIVEN MANUALLY OPERABLE COMPASS SAW
Joachim Csaki, Stuttgart, Germany, assignor to Ackermanu u. Schmitt K.G., Stuttgart, Germany
Filed Mar. 17, 1967, Ser. No. 624,079
Claims priority, application Germany, Mar. 25, 1966, A 51,957
Int. Cl. B27b 11/00
U.S. Cl. 143—68                                                     5 Claims

ABSTRACT OF THE DISCLOSURE

The present invention relates to a motor-driven hand saw with a reciprocable saw blade for producing especially a straight line or a curved cut, which comprises a slide skid for slidably guiding said saw on the surface of the material to be cut, while guiding means, preferably in the form of a guiding blade, extend through a passage in the slide into a cut prepared by the saw blade of the saw and arranged shortly behind the saw blade for guiding the saw blade along a line corresponding in contour to the contour of the cut produced and engaged by said guiding blade.

---

The present invention relates to a motor driven manually operable compass saw with a slide skid mounted on the drive housing and adapted to be guided on the material being cut.

With heretofore known saws of the above mentioned type, in which the motoric drive is, similar to electric tools, provided in the manually operable device in the form of an electric motor, the slide skid mounted on the drive housing has its sliding surface guided over the plane top side of the material being cut without, however, being laterally guided or aligned with regard to the cutting gap being produced.

It is therefore an object of the present invention to provide a motor driven manually operable compass saw which will overcome the above mentioned drawback.

It is another object of this invention to provide a saw, as set forth in the preceding paragraph in which means are provided for positively guiding the saw along a straight line or an arc.

These and other objects and advantages of the invention will appear more clearly from the following specification, in connection with the accompanying drawings, in which:

FIGURE 1 is a side view of an electromotor-driven hand tool and more specifically, of an electric motor-driven compass saw according to the invention while showing a section through the slide skid, said section being taken along the line I—I of FIG. 3.

FIGURE 2 illustrates on a larger scale than FIG. 1, a section along the line II—II of FIG. 1.

FIGURE 3 is a top view of the slide skid with partially cut elements, said section being taken along the line III—III of FIG. 1.

2

Figure 4:
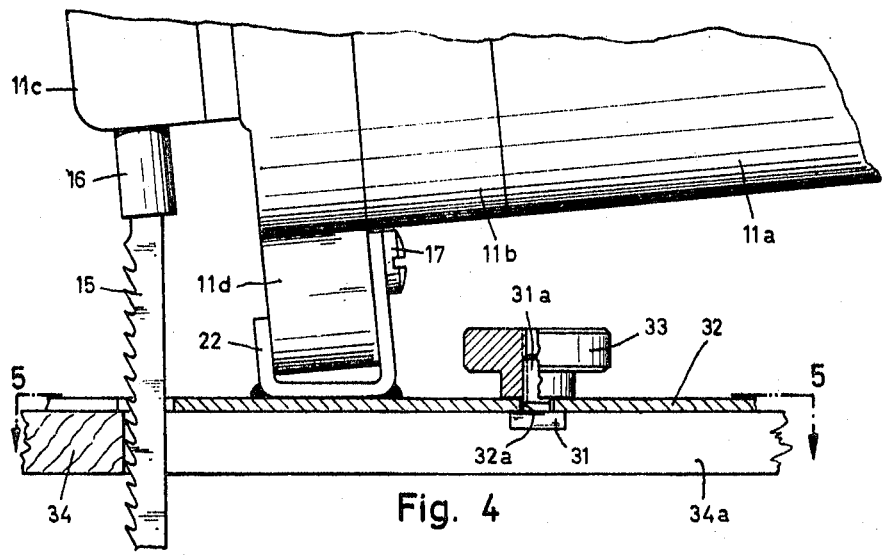
FIGURE 4 is a partial view and partial section on an enlarged scale within the range of the cutting and guiding means of a modified tool according to the present invention, said section being taken along the line IV—IV of FIG. 5.

The above mentioned problem has been solved according to the present invention by providing guiding means arranged behind and insertable with play into the gap created by said saw in the material being sawed. This guiding means which is preferably plate-shaped, extends downwardly beyond the sliding surface of the slide skid connected to the housing of the tool.

The term "motor-driven manually operable compass saw" is not to be limited to saws with an electric motor built therein, but also includes saws in which the drive is transmitted through a flexible shaft.

In view of the guiding means provided according to the present invention, either on the driving housing, or on the slide skid slightly behind the cutting area of the saw, the course of the cut is automatically determined so that it no longer depends exclusively on the skill of the operator in order to make the cut follow a predetermined line.

If, in conformity with a further development of the invention, the guiding means is connected to the drive housing so as to be adjustable between a position at which it engages the gap cut by the saw and a position above the material being cut, the guiding means can easily be moved into an ineffective position whenever, due to a desired irregular course of the cut, it is not possible to guide the tool by a guiding means inserted into the cut gap.

An adjustment of the guiding means, particularly when the latter is in the form of a guiding plate, will be especially easy if the guiding means is tiltably supported by a pivot having its longitudinal axis substantially parallel to the sliding surface of the slide skid while the guiding means is tiltable through a cutout in the slide skid.

In order to be able to guide the saw also along circular cuts, the present invention provides that the guiding means is connected to the slide skid by connecting means which permit laterally offsetting the guiding means with regard to the plane of the saw blade. For this lateral offsetting of the guiding means it is particularly advantageous to provide an oblong hole arranged in said slide skid and extending along a concave arc toward the saw blade while said connecting means is adjustable and arrestable in said oblong hole. In this connection it is furthermore advantageous when forming the guiding means in the form of a plate or blade, so to design the connecting means that the latter will permit a turning of the plane of the guiding plate.

Referring now to the drawings in detail, the tool shown therein comprises a housing 11 with a housing section 11a having arranged therein an electric motor. The rear end of housing section 11a has connected thereto a handle 14 with a switch 12 and a feeding cable 13. The front end of housing section 11a has connected thereto a housing section 11b in which a transmission (not shown) is mounted while a further housing section 11c connected to housing section 11b comprises the drive for a compass saw 15. The compass saw 15 in its turn is connected to a reciprocable pushrod 16 which protrudes from the housing section 11c.

Housing section 11c is provided with an extension 11d having connected thereto by means of a screw 17 a U-shaped clamp 22. The longer leg of said clamp 22 has fastened thereto a foot plate 18a of a bearing support 18. This connection is advantageously effected by means of a screw bolt 19 extending through the two legs of clamp 22 and also extending through the extension 11d. This bearing support 18 has two bearing side walls 18b which are substantially perpendicular to the foot plate 18a and which support the pin 20. Pivotally supported by said pin 20 are two legs or prongs 21a of a fork pertaining to a guiding plate 21, said legs being spaced from each other by a spacer bushing 23.

FIGS. 1 and 2 show the guiding plate 21 in its lower tilting end position in which it extends through a cutout 24a of the slide skid 24 which in its turn is connected to the web portion of clamp 22, for instance by welding. Slide skid 24 also comprises additional cutouts 24b and 24c. The saw 15 extends through the cutout 24c.

As will be seen from the drawings, the saw 15 will produce a cut or cutting gap 25a in a wooden board 25. The guiding plate or blade 21 extends into said gap 25a at a short distance behind the saw 15. This arrangement will assure a straight course of the guiding gap in view of the guiding blade 21 engaging the cutting gap.

If the tool is to be used without being guided, it is sufficient to tilt the guiding blade 21 upwardly about its pivot 20 into the position indicated in FIG. 1 by dash lines. The guiding blade 21 may be held in its elevated position by removable pins 26 or any other standard means.

Figure 5:
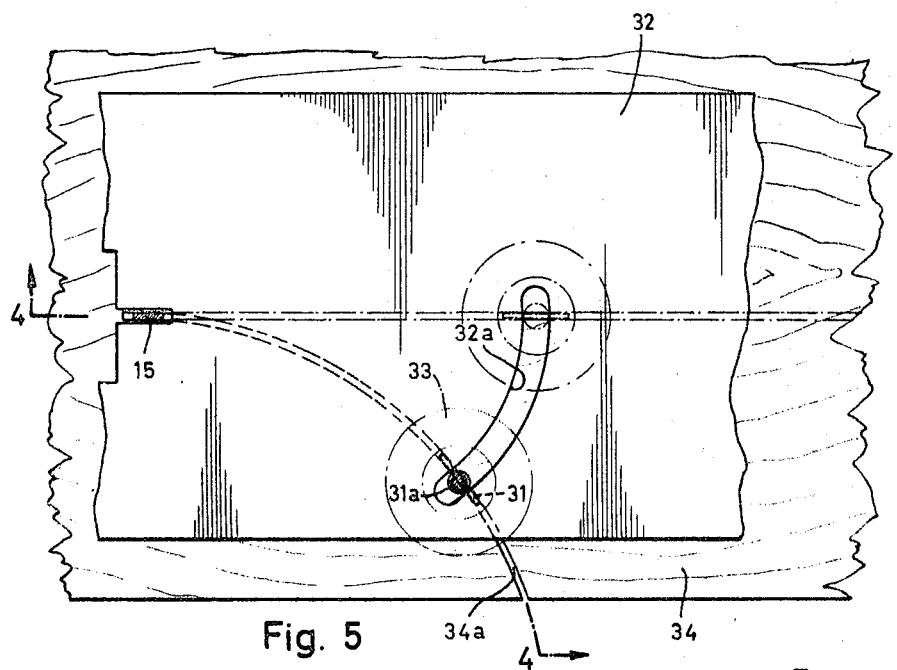
FIGURE 5 is a top view of the slide skid with partially cut elements, said section being taken along the line V—V of FIG. 4.

The embodiment illustrated in FIGS. 4 and 5 comprise parts similar to those shown in FIGS. 1 and 2 and, accordingly, corresponding parts in FIGS. 4 and 5 have been designated with the same reference numerals as in FIGS. 1 and 2.

In contrast to the embodiment of FIGS. 1 and 2, the tool of FIGS. 4 and 5 is so designed that the driving housing 11 or the clamp 22 connected thereto does not support the guiding blade. Instead, the guiding blade 31 is provided at the lower end of a bolt 31a which from below extends through an oblong opening 32a in the slide skid 32 and is adapted to be clamped fast by means of a knurled nut 33. With these connecting means 31a and 33 it is possible on one hand to offset or displace the guiding blade 31 by sliding the same in the oblong opening 32a laterally with regard to the plane of the saw blade while at the same time said guiding blade 31 can be tilted relative to the said plane. As will be seen from the drawing, the oblong opening 32a follows an arc which is concave with regard to the saw blade 15.

It will be obvious from FIG. 5 that the displacement or lateral offset location and the tilting of the guiding blade 31 will result in a cutting gap 34a in board 34 following an arc.

It is, of course, to be understood that the present invention is, by no means, limited to the particular embodiments shown in the drawings but also comprises any modifications within the scope of the appended claims.

What I claim is:

1. A motor-driven hand saw with a reciprocable saw blade for producing a cut, which includes: a slide skid having a passage therethrough and connected to said saw for supporting said saw on the surface of the material to be cut while the saw moves over the said surface, and guiding means extending through said passage and supported by one of said saw and slide skid rearwardly of the saw blade and adapted to extend into the slot cut by the saw blade.

2. A saw according to claim 1, in which said guiding means is attached to said slide skid and said passage extends in a direction to permit a lateral offset location of the guiding means relative to the plane of the saw blade.

3. A saw according to claim 2, in which said passage is in the form of an oblong aperture extending along a concave arc with regard to the saw blade, and means engaging said guiding means for adjusting and arresting said guiding means in any desired position along said oblong aperture.

4. A saw according to claim 3, in which said guiding means is in the form of a blade adjustable about an axis perpendicular to the longitudinal extension of said blade and also perpendicular to the major surfaces of said skid.

5. A saw according to claim 1, in which said guiding means consists of a threaded bolt having its head arranged in the form of a blade for engagement with a cut produced by said saw blade and having a threaded shank extending upwardly through said passage, and nut means arranged above said skid and threadedly engaging said shank.

References Cited

UNITED STATES PATENTS

| 2,736,203 | 2/1956 | Shore | 143—68 X |
| 2,819,742 | 1/1958 | Blachly | 143—159 |
| 3,146,675 | 9/1964 | Anderson | 90—12 |

DONALD R. SCHRAN, Primary Examiner

U.S. Cl. X.R.

30—273

UNITED STATES PATENT OFFICE
CERTIFICATE OF CORRECTION

Patent No. 3,456,698                                                                             July 22, 1969

Joachim Csaki

It is certified that error appears in the above identified patent and that said Letters Patent are hereby corrected as shown below:

In the heading to the printed specification, lines 4 and 5, 'Ackermanu u. Schmitt K.G." should read -- Ackermann u. Schmitt C.G. --.

Signed and sealed this 20th day of October 1970.

(SEAL)
Attest:

Edward M. Fletcher, Jr.                                    WILLIAM E. SCHUYLER, JR.
Attesting Officer                                                   Commissioner of Patents